US009884216B2

(12) United States Patent
Kochelek et al.

(10) Patent No.: US 9,884,216 B2
(45) Date of Patent: Feb. 6, 2018

(54) ELECTRICALLY OPERATED GAS VENTS FOR FIRE PROTECTION SPRINKLER SYSTEMS AND RELATED METHODS

(71) Applicant: Engineered Corrosion Solutions, LLC, St. Louis, MO (US)

(72) Inventors: Jeffrey T. Kochelek, Creve Coeur, MO (US); Adam H. Hilton, Chesterfield, MO (US); Lucas E. Kirn, St. Louis, MO (US); Matthew J. Kochelek, Chesterfield, MO (US)

(73) Assignee: ENGINEERED CORROSION SOLUTIONS, LLC, St. Louis, MO (US)

( * ) Notice: Subject to any disclaimer, the term of this patent is extended or adjusted under 35 U.S.C. 154(b) by 324 days.

(21) Appl. No.: 14/556,642

(22) Filed: Dec. 1, 2014

(65) Prior Publication Data

US 2015/0083441 A1 Mar. 26, 2015

Related U.S. Application Data

(63) Continuation of application No. PCT/US2013/043707, filed on May 31, 2013.

(Continued)

(51) Int. Cl.
*A62C 35/60* (2006.01)
*A62C 37/00* (2006.01)

(Continued)

(52) U.S. Cl.
CPC .............. *A62C 35/60* (2013.01); *A62C 35/68* (2013.01); *A62C 37/00* (2013.01); *A62C 37/04* (2013.01)

(58) Field of Classification Search
CPC ......... A62C 35/60; A62C 37/04; A62C 35/68; A62C 37/00
See application file for complete search history.

(56) References Cited

U.S. PATENT DOCUMENTS

| | | | |
|---|---|---|---|
| 1,246,798 | A | 11/1917 | Thompson |
| 1,459,594 | A | 6/1923 | McWhorter et al. |

(Continued)

FOREIGN PATENT DOCUMENTS

| | | |
|---|---|---|
| CN | 201423104 | 3/2010 |
| JP | S62191031 | 8/1987 |

(Continued)

OTHER PUBLICATIONS

Engineered Corrosion Solutions, Ejector Automatic Air Vent product information, 3 pages, Mar. 30, 2009.

(Continued)

*Primary Examiner* — Arthur O Hall
*Assistant Examiner* — Joel Zhou
(74) *Attorney, Agent, or Firm* — Harness, Dickey & Pierce, P.L.C.

(57) ABSTRACT

A fire protection sprinkler system includes a water source, a sprinkler, a piping network interconnecting the water source and the sprinkler, and an automatic gas vent coupled to the piping network and configured to discharge gas from the system. The automatic gas vent includes a sensor configured to sense a presence or absence of a liquid and an electrically operated valve. The automatic gas vent is configured to open the electrically operated valve in response to the sensor sensing the absence of a liquid and close the electrically operated valve in response to the sensor sensing the presence of a liquid. Automatic gas vent assemblies and methods of venting and discharging gas from fire protection sprinkler systems are also disclosed.

23 Claims, 5 Drawing Sheets

Related U.S. Application Data

(60) Provisional application No. 61/653,733, filed on May 31, 2012.

(51) Int. Cl.
*A62C 35/68* (2006.01)
*A62C 37/36* (2006.01)

(56) References Cited

U.S. PATENT DOCUMENTS

| | | | | |
|---|---|---|---|---|
| 3,905,424 | A | 9/1975 | Elwood et al. | |
| 3,969,092 | A | 7/1976 | Huffman et al. | |
| 4,197,097 | A | 4/1980 | Magorien et al. | |
| 4,991,655 | A | 2/1991 | McHugh | |
| 5,611,218 | A | 3/1997 | Naumovitz | |
| 5,803,180 | A | 9/1998 | Talley | |
| 6,024,116 | A | 2/2000 | Almberg et al. | |
| 6,076,278 | A | 6/2000 | Bradley | |
| 6,221,263 | B1 | 4/2001 | Pope et al. | |
| 6,415,870 | B1 | 7/2002 | Matsuoka | |
| 6,581,694 | B2 | 6/2003 | Golner et al. | |
| 6,601,653 | B2 | 8/2003 | Grabow et al. | |
| 6,606,994 | B1 * | 8/2003 | Clark ................ | A61M 16/0808 128/204.18 |
| 6,841,125 | B1 | 1/2005 | Chartier et al. | |
| 6,926,023 | B2 | 8/2005 | Cabral et al. | |
| 6,960,321 | B1 | 11/2005 | Ludwig | |
| 7,066,186 | B2 | 6/2006 | Bahr | |
| 7,104,336 | B2 | 9/2006 | Ozment | |
| 7,124,834 | B2 | 10/2006 | Sundholm et al. | |
| 7,389,824 | B2 | 6/2008 | Jackson | |
| 7,594,545 | B2 | 9/2009 | Love | |
| 7,673,694 | B2 | 3/2010 | Wagner et al. | |
| 7,717,776 | B2 | 5/2010 | Wagner et al. | |
| 7,921,577 | B2 | 4/2011 | Reilly et al. | |
| 8,122,968 | B2 | 2/2012 | Johnson | |
| 8,636,023 | B2 | 1/2014 | Burkhart et al. | |
| 8,720,591 | B2 | 5/2014 | Burkhart et al. | |
| 2007/0000258 | A1 | 1/2007 | Bonaquist et al. | |
| 2008/0060216 | A1 | 3/2008 | Reilly et al. | |
| 2010/0065287 | A1 | 3/2010 | Burkhart et al. | |
| 2010/0263882 | A1 | 10/2010 | Bodemann | |
| 2011/0094758 | A1 * | 4/2011 | Burkhart ................ | A62C 35/62 169/17 |
| 2011/0108123 | A1 * | 5/2011 | Burkhart ................ | A62C 35/60 137/2 |
| 2011/0226495 | A1 * | 9/2011 | Burkhart ................ | A62C 35/62 169/16 |
| 2013/0153036 | A1 * | 6/2013 | Young ................ | F16K 37/0033 137/1 |
| 2014/0048290 | A1 | 2/2014 | Bodemann | |

FOREIGN PATENT DOCUMENTS

| | | |
|---|---|---|
| JP | 2001-340483 | 12/2001 |
| JP | 2002-119610 | 4/2002 |
| JP | 2006-247237 | 9/2006 |
| JP | 2008-073227 | 4/2008 |
| JP | 2008-167947 | 7/2008 |

OTHER PUBLICATIONS

Engineered Corrosion Solutions, Ejector Automatic Air Vent product information, 3 pages, Jul. 15, 2008.

Potter Electric Signal; Sprinkler Monitoring Training Manual; National Fire Protection Associate [NFPA] and National Electric Manufacturers Association [NEMA]; 46 pages; Retrieved online on Mar. 27, 2009 at http://pottersignal.com/sprinkler_datasheets.aspx.

Compressed Gas Technologies, Nitrogen Generator Specialists, 2009; 1 page; Retrieved online on Mar. 27, 2009 at http://www.nitrogen-generators.com.

General Air Products; Dry Air Pac FM Approved Compressor Dryer Package for Critical Applications from Generators; Copyright 2009; 4 pages; Retrieved online on Mar. 27, 2009 at http://www.generalairproducts.com/fireprotection/content/view/16/88/.

General Air Products; Desiccant Dryers; 2 pages; Retrieved online on Mar. 27, 2009 at http://www.generalairproducts.com/pages2/desiccant-dryers.html.

O'Keefe Controls Co., Metal Orifice Assemblies product information, 6 pages, 2006.

On Site Gas Systems, Copyright 2009; 2 pages; Retrieved online on Mar. 27, 2009 at http://www.onsitegas.com.

Kinsley, Jr., George R., "Properly Purge and Inert Storage Vessels," CEP Magazine, Feb. 2001, pp. 57-61.

* cited by examiner

ELECTRICALLY OPERATED GAS VENTS FOR FIRE PROTECTION SPRINKLER SYSTEMS AND RELATED METHODS

CROSS-REFERENCE TO RELATED APPLICATIONS

This application is a continuation of International Application No. PCT/US2013/043707 filed May 31, 2013 and claims the benefit of U.S. Provisional Application No. 61/653,733 filed May 31, 2012. The entire disclosures of the above applications are incorporated herein by reference.

FIELD

The present disclosure relates to electrically operated gas vents for fire protection sprinkler systems and methods of venting gas from fire protection sprinkler systems.

BACKGROUND

This section provides background information related to the present disclosure which is not necessarily prior art.

Fire protection sprinkler systems are commonly used for suppressing fires with water upon detecting heat or smoke. These systems typically include a water source such as a source of city water, one or more sprinklers such as fusible sprinkler heads that are activated by heat, and a piping network interconnecting the water source and sprinkler heads. Various types of water based sprinkler systems are known, such as wet pipe sprinkler systems and dry pipe sprinkler systems, including preaction systems, water mist systems, water spray systems, etc. In some cases, mechanical gas vents may be used to remove gas from the system.

SUMMARY

This section provides a general summary of the disclosure, and is not a comprehensive disclosure of its full scope or all of its features.

According to one aspect of the present disclosure, a fire protection sprinkler system includes a water source, at least one sprinkler, a piping network interconnecting the water source and the at least one sprinkler, and an automatic gas vent coupled to the piping network and configured to discharge gas from the piping network. The automatic gas vent includes a sensor configured to sense a presence or absence of a liquid, and an electrically operated valve. The automatic gas vent is configured to open the electrically operated valve in response to the sensor sensing the absence of a liquid and close the electrically operated valve in response to the sensor sensing the presence of a liquid.

According to another aspect of the present disclosure, an automatic gas vent assembly for a fire protection sprinkler system is disclosed. The fire protection sprinkler system includes a water source and at least one sprinkler. The automatic gas vent assembly includes a sensor configured to sense a presence or absence of a liquid in the automatic gas vent assembly, and an electrically operated valve. The automatic gas vent assembly is configured to open the electrically operated valve in response to the sensor sensing the absence of a liquid and close the electrically operated valve in response to the sensor sensing the presence of a liquid.

According to a further aspect of the present disclosure, a method of venting gas from a fire protection sprinkler system using an automatic gas vent is disclosed. The fire sprinkler system includes a water source and at least one sprinkler. The automatic gas vent includes a sensor configured to sense a presence or absence of a liquid and an electrically operated valve. The method includes opening the electrically operated valve in response to the sensor sensing the absence of a liquid and closing the electrically operated valve in response to the sensor sensing the presence of a liquid.

According to yet another aspect of the present disclosure, a method of discharging gas from a fire sprinkler system is disclosed. The fire sprinkler system includes a water source and a piping network connected to the water source. The method includes sensing a presence of a gas within the piping network with a sensor, actuating an electrically operated valve in response to the sensing, and discharging the gas through the electrically operated valve.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
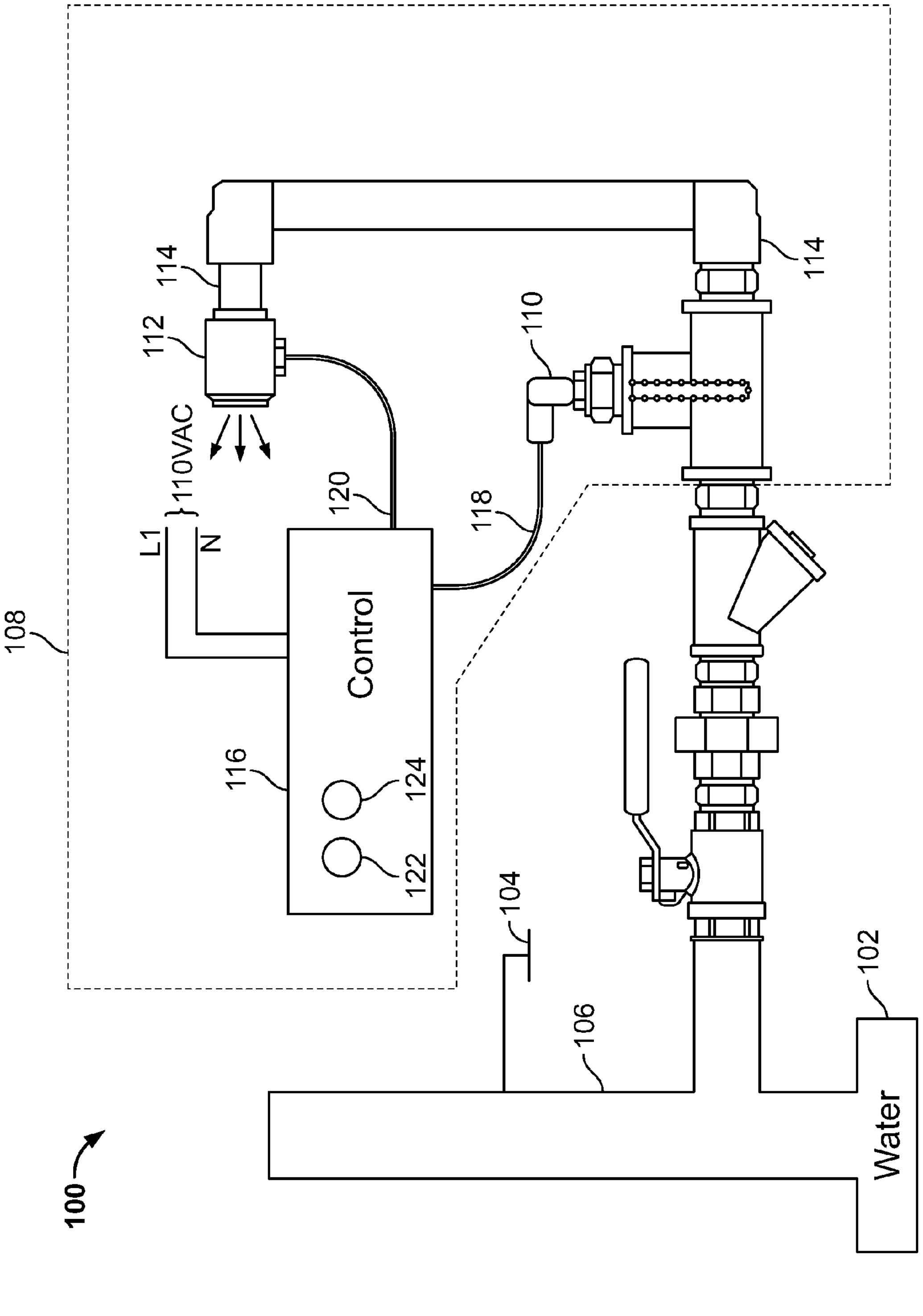
FIG. 1 is a block diagram of a fire protection sprinkler system including an automatic gas vent assembly according to one example embodiment of the present disclosure.
Figure 2:
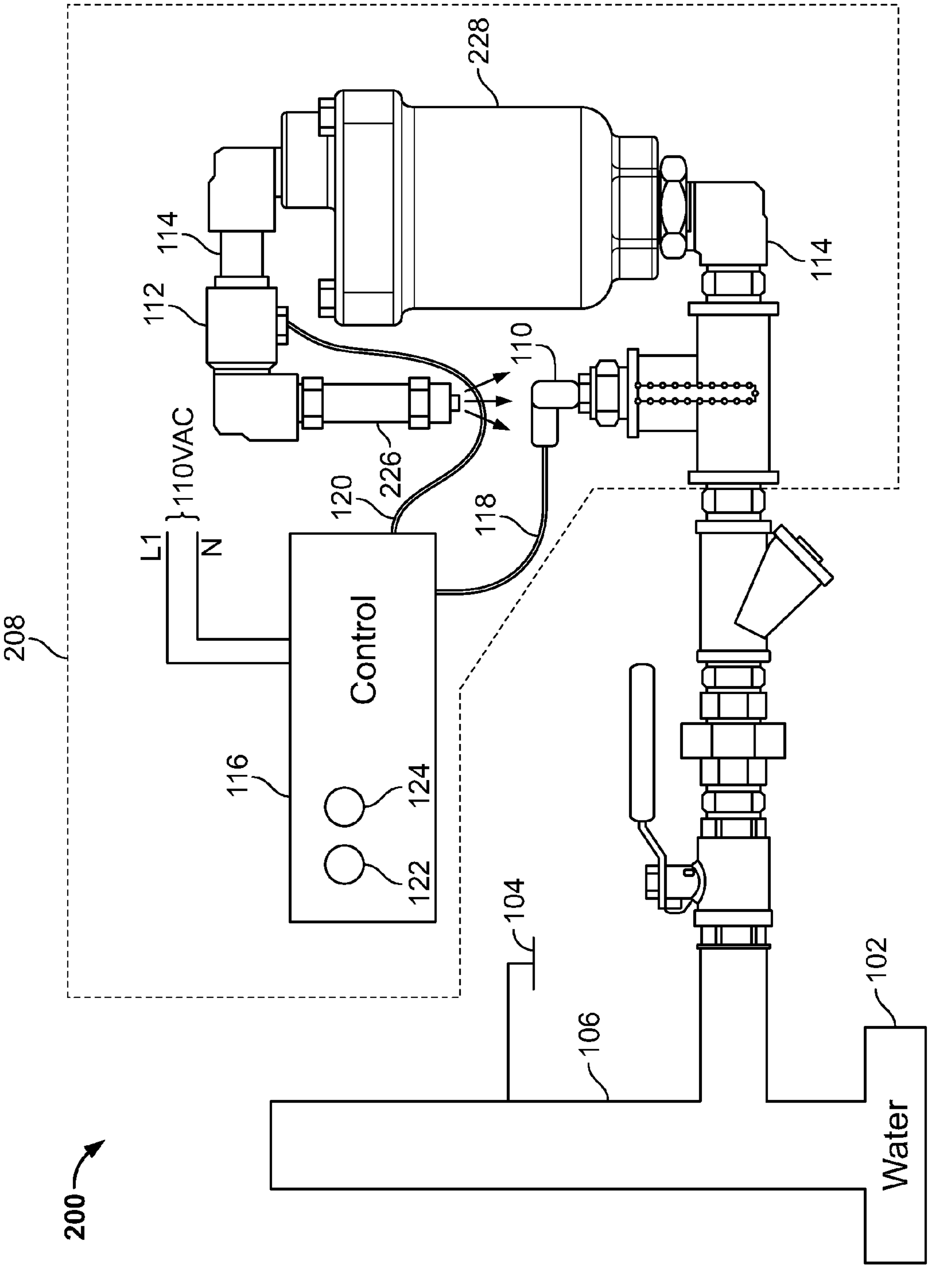
FIG. 2 is a block diagram of a fire protection sprinkler system including an automatic gas vent assembly having a redundant gas vent and a pressure-operated valve according to another example embodiment of the present disclosure.
Figure 3A:
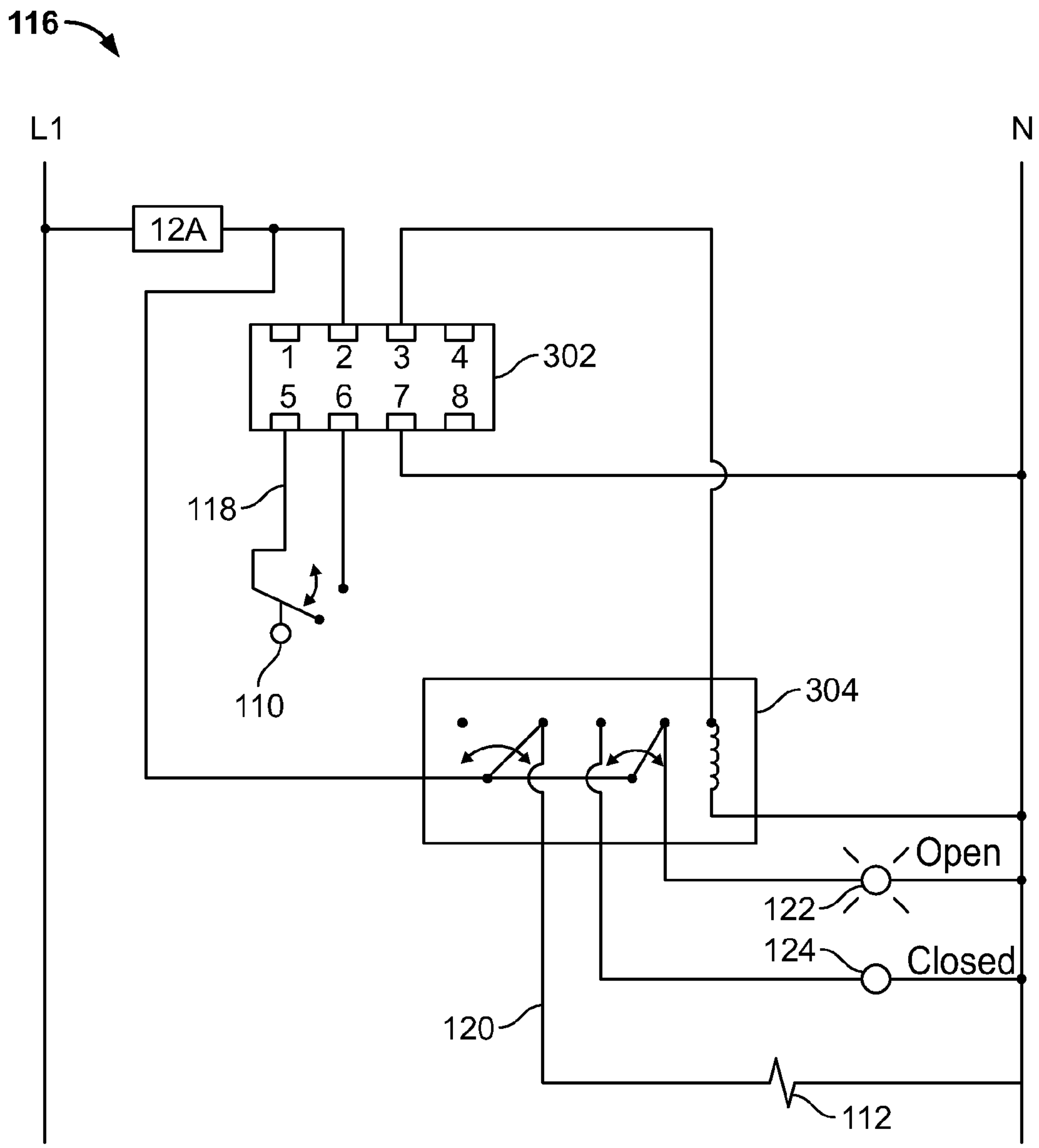
Figure 3B:
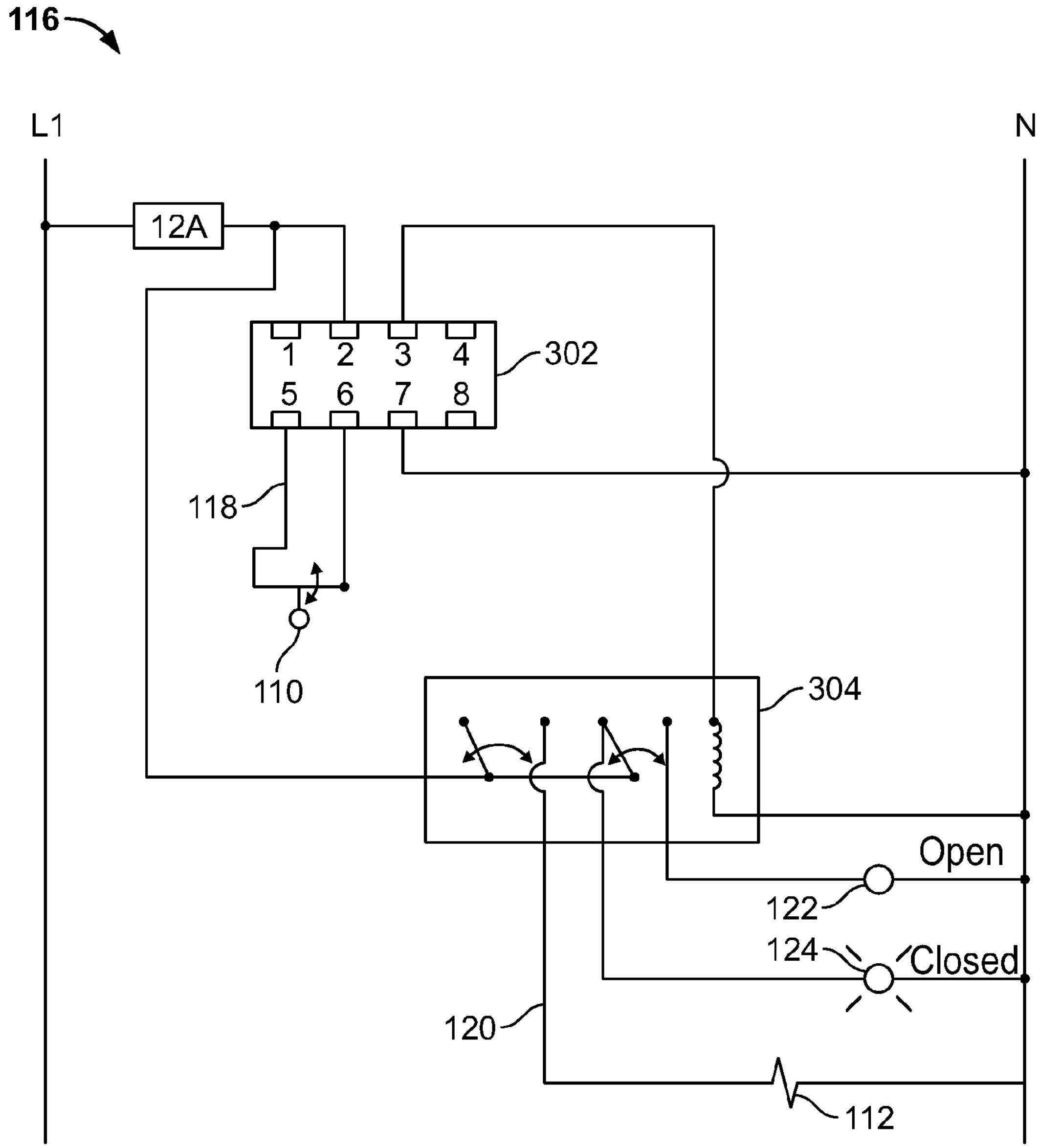

FIGS. 3*a* and 3*b* are schematic diagrams of an example electrical control for the automatic gas vent assemblies shown in FIGS. 1 and 2.

Figure 4:
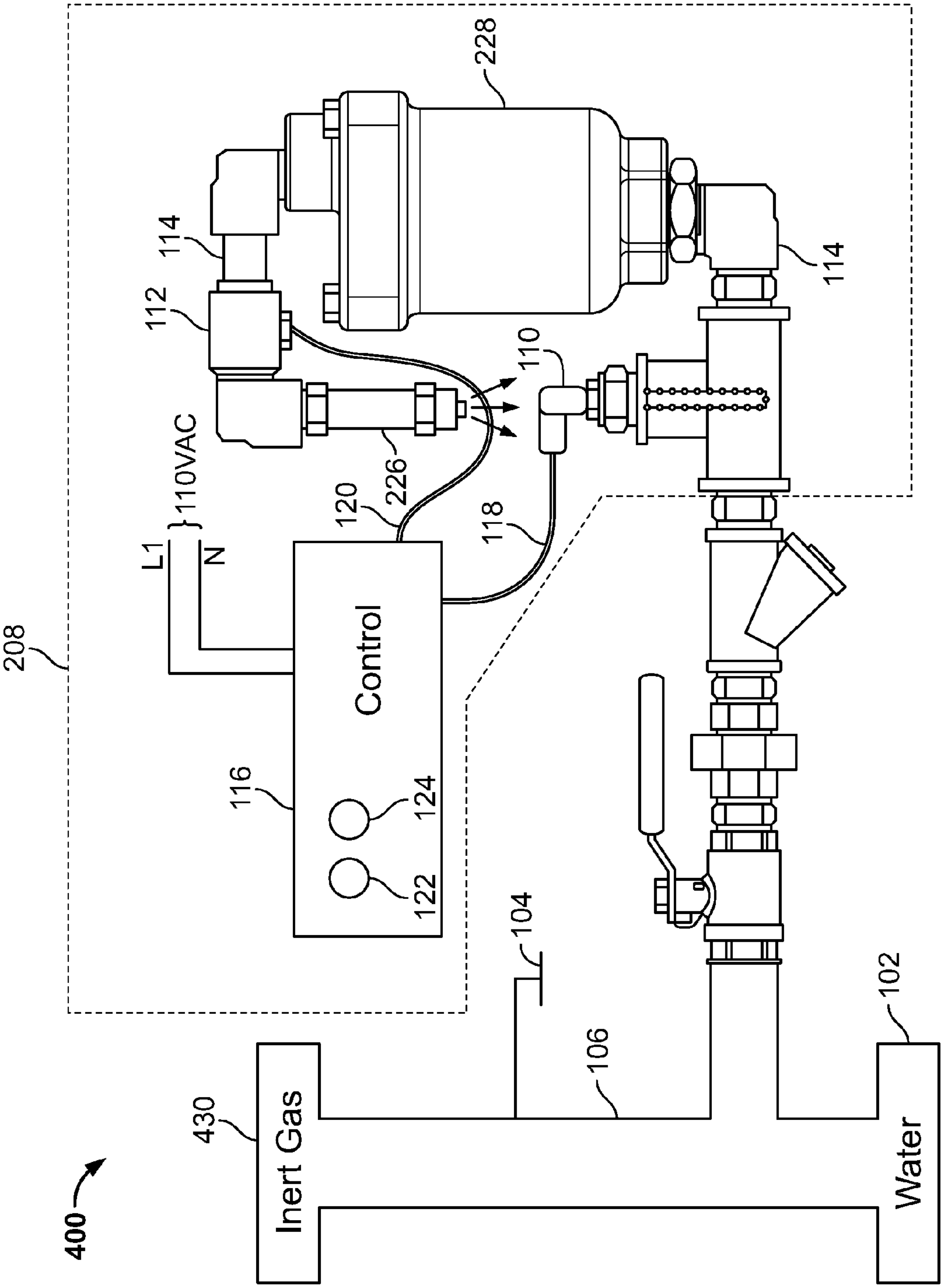

FIG. 4 is a block diagram of the fire protection sprinkler system of FIG. 2 coupled to an inert gas source according to another example embodiment of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The methods, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A fire protection sprinkler system according to one example embodiment of the present disclosure is illustrated in FIG. 1 and indicated generally by reference number 100. As shown in FIG. 1, the system 100 includes a water source 102, a sprinkler 104 and a piping network 106 interconnecting the water source 102 and the sprinkler 104. The system 100 further includes an automatic gas vent 108 coupled to the piping network 106 and configured to discharge gas from the piping network 106. In the particular example shown in FIG. 1, the automatic gas vent 108 is configured as an assembly for coupling to the piping network 106 as a single unit.

As shown in FIG. 1, the automatic gas vent assembly 108 includes a sensor 110 configured to sense a presence or absence of a liquid and an electrically operated valve 112. The automatic gas vent assembly 108 is configured to open the electrically operated valve 112 in response to the sensor 110 sensing the absence of a liquid and close the electrically operated valve 112 in response to the sensor 110 sensing the presence of a liquid.

The automatically gas vent assembly 108 allows gas to be automatically discharged from the piping network 106 via the electrically operated valve 112 (as indicated by the arrows in FIG. 1) without also discharging water. This is because the electrically operated valve 112 is automatically opened in response to the sensor 110 sensing the absence of water, and automatically closed in response to the sensor 110 sensing the presence of water (e.g., when the piping network 106 is being filled with water, or after a gas bubble moves past the sensor 110).

The sensor 110 may be any type of sensor adapted to sense the absence or presence of a liquid. In the particular example shown in FIG. 1, the sensor 110 is an electrical conductance probe. Thus, low (including no) conductance indicates the absence of liquid and high conductance indicates the presence of liquid. Additionally, while only one sensor 110 is illustrated in FIG. 1, more than one sensor may be employed without departing from the scope of the present disclosure. The sensor 110 (and additional sensors, if employed) may be positioned at any suitable location in the system 100.

The electrically operated valve 112 is preferably a normally closed valve so the valve 112 will automatically close when electric power is lost. In this manner, the valve 112 will not allow water to escape from the piping network 106 when electric power is removed from the automatic gas vent assembly 108 (e.g., during a power outage). In the particular example shown in FIG. 1, the valve 112 is a normally closed, solenoid-operated valve.

As shown in FIG. 1, the assembly 108 includes space (e.g., in the piping 114) between the sensor 110 and the electrically operated valve 112 for containing a pressurized air bubble. For example, suppose the piping network 106 is initially dry and filled only with air. During this time, the electrically operated valve 112 will be open. When the piping network 106 is subsequently filled with water, the electrically operated valve 112 will close in response to the sensor 110 sensing the presence of water. As a result, an air bubble will be trapped by the electrically operated valve 112 in the space between the sensor 110 and the valve 112. The water pressure in the piping network 106 will compress and reduce the volume of the trapped air bubble until the pressure of the air bubble reaches the water pressure in the piping network 106.

Conversely, when the fire protection system 100 is drained, the trapped air bubble will decompress and expand in volume to help remove water from around the sensor 110, causing the sensor 100 to sense the absence of water. This, in turn, will cause the electrically operated valve 112 to open and essentially reset the automatic gas vent assembly 108 before the piping network 106 is filled again with water.

As shown in FIG. 1, the automatic gas vent assembly may also include an electrical control 116 coupled to the sensor 110 (e.g., via cable 118) and coupled to the electrically operated valve 112 (e.g., via cable 120). The electrical control 116 is configured to open the electrically operated valve 112 in response to the sensor 110 sensing the absence of a liquid, and close the electrically operated valve 112 in response to the sensor 110 sensing the presence of a liquid. The electrical control 116 may be powered by 110 VAC, as shown in FIG. 1, or any other suitable AC or DC power source.

Additionally, the electrical control 116 is configured to produce an electrical output indicating a state of the electrically operated valve 112. This output may be provided, e.g., to one or more visual indicators (e.g., LEDs) for indicating whether the electrically operated valve is open or closed. In the example embodiment shown in FIG. 1, the electrical control 116 includes two visual indicators 122, 124. The indicator 122 is activated (e.g., turned on) when the electrically operated valve 112 is open, and the indicator 124 is activated when the electrically operated valve 112 is closed. Preferably, indicator 122 is red and indicator 124 is green.

FIG. 2 illustrates a fire protection sprinkler system 200 having an automatic gas vent assembly 208 that is similar to the assembly 108 shown in FIG. 1, but further includes an optional pressure-operated valve 226 as well as an optional redundant gas vent 228.

The pressure-operated valve 226 is in fluid communication with the electrically operated valve 112 and has a pressure setting that may be set in the factory or manually in the field. The pressure-operated valve 226 is configured to prevent an ingress of air into the system 200 through the pressure-operated valve 226. In other words, the pressure-operated valve 226 operates as a one-way valve that allows gas to exit the system 200 (as indicated by the arrows in FIG. 2) while preventing gas (including oxygen-rich air that may cause corrosion) from entering the system 200.

The pressure setting of the pressure-operated valve 226 is preferably below the water pressure of the water source 102. As a result, the water pressure of the water source 102 will be sufficient to discharge gas through the pressure-operated valve 226 as the piping network 106 is being filled with water. In some embodiments, the pressure setting of the pressure-operated valve 226 is about forty pounds per square inch gauge (PSIG).

Additionally, the pressure-operated valve 226 may increase the amount of air compressed in the space (e.g., in the piping 114) between the sensor 110 and the electrically operated valve 112 when the piping network 106 is filling with water. Initially, when the electrically operated valve 112 is open, the air in the space between the sensor 110 and the valve 112 will compress and reach the pressure setting of the pressure-operated valve (e.g., about forty PSIG) before air begins to exit the system 200 via the pressure-operated valve 226. Thus, a compressed air bubble will already exist in the space between the sensor 110 and the electrically operated valve 112 while the valve 112 is still open. When the electrically operated valve 112 closes in response to the sensor 110 sensing the presence of water, the water pressure in the piping network 106 will further compress and reduce the volume of the trapped air bubble until the pressure of the air bubble reaches the water pressure in the piping network 106. Thus, a larger volume of air may be trapped and compressed in the system 200 of FIG. 2 as compared to the system 100 of FIG. 1, due to the pressure-operated valve 226.

Consequently, when the fire protection system 200 is drained, the trapped air bubble will decompress and expand in volume to a greater extent than in the system 100 of FIG. 1. Therefore, in terms of removing water from around the sensor 110 so the electrically operated valve 112 will open during draining, the system 200 of FIG. 2 may perform better than the system 100 of FIG. 1.

In some embodiments, the pressure-operated valve 226 may emit an audible indicator when the pressure-operated valve 226 is discharging gas from the system 200.

In the particular embodiment shown in FIG. 2, the pressure-operated valve 226 is a pressure relief valve. Alternatively, any other suitable type of pressure-operated valve may be employed including, e.g., a check valve, etc.

The redundant gas vent 228 shown in FIG. 2 is configured to vent gas and retain liquid, and is preferably positioned between the sensor 110 and the electrically operated valve 112. The redundant gas vent 228 provides additional assurance that no water will be discharged from the system 200 during normal operation, and also ensures no water will be discharged from the system 200 due to a failure of the sensor 110 and/or the electrically operated valve 112.

The redundant gas vent 228 may be any suitable gas vent, and is preferably a passive mechanical gas vent to ensure no water will be discharged from the system during a power outage, even if the electrically operated valve 112 malfunctions. In the particular example shown in FIG. 2, the redundant gas vent 228 is a float operated valve of the type made by Apco.

FIGS. 3A and 3B illustrate one example embodiment of the electrical control 116 shown in FIGS. 1 and 2. As shown in FIG. 3A, the example electrical control 116 includes a board level controller 302 coupled to the sensor 110 (e.g., an electrical conductance probe), and a relay 304 coupled to the electrically operated valve 112 and the visual indicators 122, 124.

When the sensor 110 senses the absence of water, the sensor 110 presents an open circuit to the board level controller 302, as shown in FIG. 3A. In response, the board level controller 302 energizes the coil of the relay 304. As a result, the relay 304 provides power to the electrically operated valve 112 to open the valve 112, and also provides power to the “open” indicator 122, as shown in FIG. 3A.

Conversely, when the sensor 110 senses the presence of water, the sensor 110 presents a closed circuit to the board level controller 302, as shown in FIG. 3B. In response, the board level controller 302 deenergizes the coil of the relay 304. As a result, the relay 304 removes power from the electrically operated valve 112, causing the valve 112 to close, while providing power to the “closed” indicator 124, as shown in FIG. 3B.

In the example embodiment shown in FIGS. 3A and 3B, the relay 304 is a double pole, double throw (DPDT) relay.

FIG. 4 illustrates a fire protection sprinkler system 400 according to another example embodiment of this disclosure. The system 400 of FIG. 4 is similar to the system 200 of FIG. 2, but further includes an inert gas source 430 coupled to the piping network 106. The inert gas source 430 may include a nitrogen generator, nitrogen bottle(s), or the like. The inert gas source 430 may be used to displace oxygen in the piping network with an inert gas (i.e., a gas that does not react with system components), such as nitrogen, to minimize corrosion in the system 400.

The fire protection systems described herein may be any suitable type of water-based fire protection sprinkler systems such as, for example, wet pipe sprinkler systems, dry pipe sprinkler systems, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A fire protection sprinkler system comprising:
a water source;
at least one sprinkler;
a piping network interconnecting the water source and the at least one sprinkler, and
an automatic gas vent coupled to the piping network and configured to discharge gas from the piping network, the automatic gas vent including a sensor configured to sense a presence or absence of a liquid, and an electrically operated valve, the automatic gas vent configured to open the electrically operated valve in response to the sensor sensing the absence of a liquid and close the electrically operated valve in response to the sensor sensing the presence of a liquid, the automatic gas vent including a space between the sensor and the electrically operated valve for containing a pressurized gas bubble when the fire protection sprinkler system is filled with water, wherein the pressurized gas bubble will expand in volume and remove water from around the sensor when the fire protection sprinkler system is drained.

2. The system of claim 1 wherein the fire protection sprinkler system is a wet pipe sprinkler system.

3. The system of claim 2 wherein the sensor comprises an electrical conductance probe.

4. The system of claim 2 wherein the electrically operated valve is a solenoid-operated valve.

5. The system of claim 2 wherein the electrically operated valve is a normally closed valve.

6. The system of claim 2 wherein the automatic gas vent further comprises a pressure-operated valve in communication with the electrically operated valve and wherein the pressure-operated valve has a pressure setting.

7. The system of claim 6 wherein the pressure setting is about 40 pounds per square inch gauge (PSIG).

8. The system of claim 6 wherein the pressure-operated valve is configured to prevent an ingress of air through the pressure-operated valve into the system.

9. The system of claim 6 wherein the pressure-operated valve is configured to emit an audible indicator when the pressure-operated valve is discharging gas.

10. The system of claim 6 wherein the pressure-operated valve comprises a pressure relief valve or a check valve.

11. The system of claim 2 wherein the automatic gas vent further comprises a redundant gas vent configured to vent gas and retain liquid.

12. The system of claim 11 wherein the redundant gas vent is positioned between the sensor and the electrically operated valve.

13. The system of claim 11 wherein the redundant gas vent comprises a float-operated valve.

14. The system of claim 2 wherein the automatic gas vent is configured to produce an electrical output indicating a state of the electrically operated valve.

15. The system of claim 14 wherein the automatic gas vent includes an electrical control configured to produce the electrical output indicating the state of the electrically operated valve.

16. The system of claim 2 wherein the sensor comprises an electrical probe.

17. The system of claim 2 further comprising an electrical control coupled to the sensor and the electrically operated valve, the electrical control configured to open the electrically operated valve in response to the sensor sensing the absence of a liquid and close the electrically operated valve in response to the sensor sensing the presence of a liquid.

18. The system of claim 17 wherein the electrical control comprises a relay.

19. The system of claim 2 further comprising a visual indicator for indicating whether the electrically operated valve is open or closed.

20. The system of claim 19 wherein the visual indicator is a first visual indicator having a first color for indicating when the electrically operated valve is open, the automatic gas vent further comprising a second visual indicator having a second color for indicating when the electrically operated valve is closed.

21. The system of claim 20 wherein the first color is red and the second color is green.

22. The system of claim 2 further comprising a source of inert gas coupled to the piping network.

23. The system of claim 22 wherein the source of inert gas comprises a nitrogen generator or a nitrogen bottle.

* * * * *